(12) United States Patent
Shih et al.

(10) Patent No.: US 7,426,115 B2
(45) Date of Patent: Sep. 16, 2008

(54) DYNAMIC SLIDING MODULE AND USES THEREOF

(75) Inventors: Chin-Chung Shih, Taoyuan (TW); Ching-Shih Chen, Taoyuan (TW)

(73) Assignee: High Tech Computer Corp., Taoyuan Hsien (TW)

( * ) Notice: Subject to any disclaimer, the term of this patent is extended or adjusted under 35 U.S.C. 154(b) by 0 days.

(21) Appl. No.: 11/616,397

(22) Filed: Dec. 27, 2006

(65) Prior Publication Data
US 2007/0155214 A1 Jul. 5, 2007

(30) Foreign Application Priority Data
Dec. 30, 2005 (TW) .............................. 94147789 A

(51) Int. Cl.
*H05K 5/00* (2006.01)
(52) U.S. Cl. ...................... 361/756; 439/326
(58) Field of Classification Search ................. 361/683; 439/326
See application file for complete search history.

(56) References Cited

U.S. PATENT DOCUMENTS

| 6,624,647 | B2 * | 9/2003 | Adams et al. | 324/755 |
| 2004/0242041 | A1 * | 12/2004 | Ngo | 439/159 |
| 2005/0003688 | A1 * | 1/2005 | Ngo | 439/152 |

* cited by examiner

*Primary Examiner*—Dean A. Reichard
*Assistant Examiner*—Abiy Getachew

(57) ABSTRACT

A dynamic sliding module is described. The dynamic sliding module includes a track, a dynamic slide, and a guiding device. The track includes a first opening and the guiding device is disposed adjacent to the first opening. When the dynamic slide slides along the track and aligns with the first opening, the guiding device provides a guiding force to guide the dynamic slide to move toward the first opening and enter into the track for sliding thereon. The track further includes a second opening to allow the dynamic slide to be withdrawn form the track. The dynamic sliding module further includes an elastic device and/or a wedge-shaped device disposed adjacent to the second opening to assist the dynamic slide to be withdrawn from the track.

21 Claims, 3 Drawing Sheets

DYNAMIC SLIDING MODULE AND USES THEREOF

RELATED APPLICATIONS

The present application is based on, and claims priority from, Taiwan Application Serial Number 94147789, filed Dec. 30, 2005, the disclosure of which is hereby incorporated by reference herein in its entirety.

FIELD OF THE INVENTION

The present invention generally relates to a dynamic sliding module for an electronic device. More particularly, this invention relates to a magnetically dynamic sliding module for an electronic device.

BACKGROUND OF THE INVENTION

Since wireless communication technology is highly developed, mobile phones are becoming increasingly light and easy to hold. Nowadays, most people use mobile phones to communicate with others. Therefore, the mobile phone has become a necessary electronic device in people's lives Due to the popularity of mobile phones, mobile phone manufacturers are working extremely hard to increase mobile phone functions in order to satisfy various requirements desired by users. For example, some of the mobile phones provide PDA functions, such as address book, calendar, minutes and/or agendas. Some mobile phones provide electronic games therein for the users to play during their idle time. Further, some mobile phones have digital cameras thereon so that users can take beautiful pictures to share with their friends.

However, a current mobile phone generally has a size smaller than that of a palm, and especially, a smaller mobile phone only has a size almost similar to that of an egg. Therefore, the surface area for the keyboard and display on a mobile phone is limited. Integrating all the foregoing functions into such a small mobile phone is difficult. To increase the available surface area, some mobile phones are designed to dispose the keyboard and the display respectively on two electronic modules, which are connected to each other via a sliding mechanism, so as to construct, for example, a slide cell phone including a sliding keyboard and a sliding display.

In order to increase the sliding stability between the sliding keyboard and the sliding display, the sliding mechanism has to occupy a predetermined length of a sliding track and thus limits the sliding length of the sliding track such that the slide-out area on the sliding keyboard is reduced. Accordingly, there is a need to reduce the waste length of the sliding track occupied by the sliding mechanism so as to increase the usable slide-out area on a slide cell phone.

SUMMARY OF THE INVENTION

It is an objective of the present invention to provide a dynamic sliding module to increase the surface area of an electronic device.

It is another objective of the present invention to provide a dynamic sliding module using an attracting force, such as a magnetic force, to engage a dynamic slide with a track in a part of the stroke thereof to increase the sliding stability for two electronic sliding modules of an electronic device.

It is yet another objective of the present invention to provide a dynamic sliding module with a dynamic slide escaping from a track in a part of the stroke thereof to increase the surface area and the stroke of two electronic sliding modules of an electronic device.

To accomplish the above objectives, the present invention provides a dynamic sliding module for coupling a first electronic module to a second electronic module of an electronic device, and increasing both the sliding reliability and the area of exposable surfaces therebetween. The electronic device is, for example, a mobile phone, such as a slider cell phone. The first electronic module is, for example, a sliding display, and the second electronic module is, for example, a sliding keyboard. The dynamic sliding module includes a track with a first opening, a dynamic slide, and a guiding device, such as an attracting device, to guide the dynamic slide into the track through the first opening while the dynamic slide is moved to be aligned with the first opening so as to enable the dynamic slide to engage with and slide on the track.

The track further includes a second opening for withdrawing the dynamic slide from the track. The dynamic sliding module further includes an elastic device coupled to the dynamic slide to withdraw the dynamic slide from the track through the second opening and back to the second electronic module. The dynamic sliding module further includes a wedge-shaped block being disposed adjacent to the second opening and having an incline to push the dynamic slide out of the track from the second opening.

The guiding device is preferably an attracting device. In one preferred embodiment, the dynamic slide is made of a magnetic material and the attracting device is made of a ferromagnetic material. In another preferred embodiment, the dynamic slide is made of a ferromagnetic material and the attracting device is made of a magnetic material. In a further another preferred embodiment, the dynamic slide and the magnetic device are made of a magnetic material and adjacent surfaces thereof have different polarities.

The dynamic sliding module can further include a magnetic device disposed above the second opening, and the dynamic slide and the magnetic device are made of a magnetic material and the adjacent surfaces thereof have the same polarity.

The dynamic sliding module can further utilize a first slide attached on the track to couple the first electronic module to the second electronic module. The diameter of the first slide is preferably larger than the diameter of the dynamic slide. More preferably, the diameter of the first slide is larger than the diameter of the first opening and/or the second opening so that the first slide can slide on the track and be prevented from escaping the track. The first slide is preferably lower than the wedge-shaped block to prevent the first slide from touching the wedge-shaped block while the dynamic slide is pushed out of the track to further increase the area of the exposable surface between the first electronic module and the second electronic module. Alternatively, the wedge-shaped block is designed to be a stopping block for stopping the first slide.

Accordingly, the dynamic sliding module according to the present invention can increase the sliding reliability of the sliding electronic modules for the electronic device, and increase the area of the exposable surfaces for the electronic device to control the electronic device and/or increase the functionality thereof. In addition, since the dynamic slide only engages with the track in a part route of the track, the dynamic sliding module can increase the variations of the electronic device, especially for the mobile phone.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is currently the best implementation of the present invention. This description is not to be taken in a limiting sense but is made merely to describe the general principles of the invention. The scope of the invention should be determined by referencing the appended claims.

Figure 1:
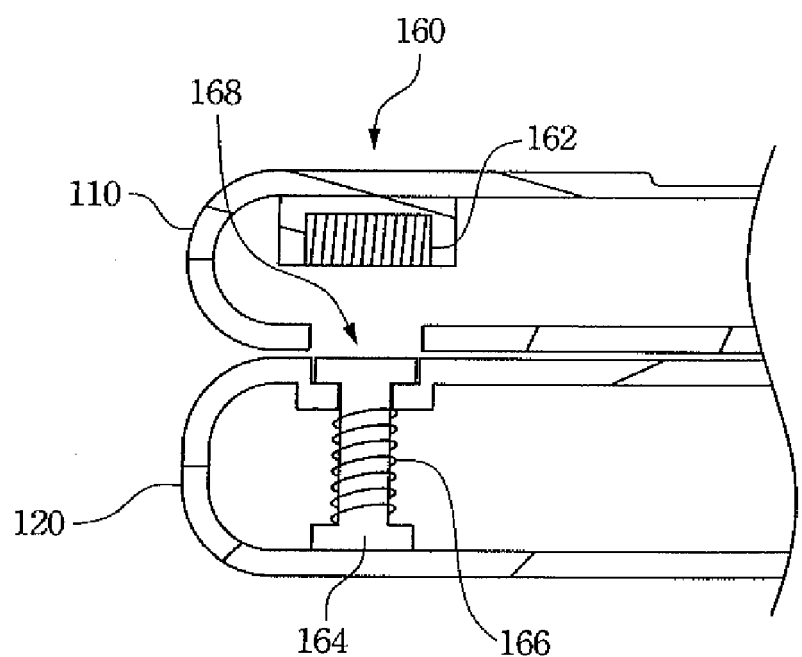
FIG. 1 illustrates a dynamic sliding module according to the present invention.

FIG. 1 illustrates a dynamic sliding module according to the present invention. An electronic device includes a first electronic module 110, a second electronic module 120, and a dynamic sliding module 160. The first electronic module 110 and the second electronic module 120 are slidable relative to each other so as to expose inner surfaces of the first electronic module 110 and the second electronic module 120.

Figure 2A:
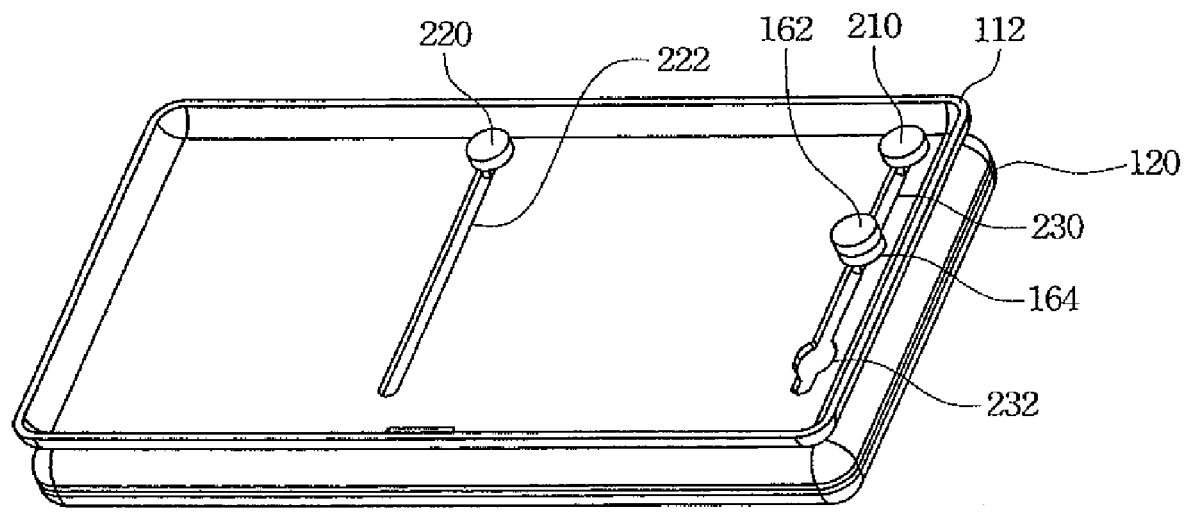
FIGS. 2A to 2C illustrate operating status of a first preferred embodiment of an electronic device with the dynamic sliding module according to the present invention.
Figure 2B:
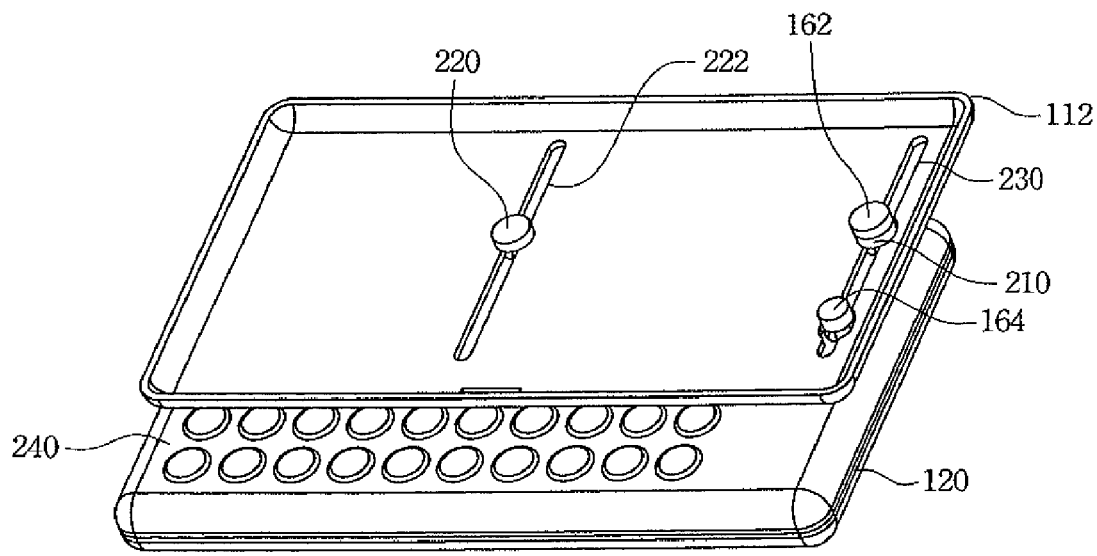
Figure 2C:
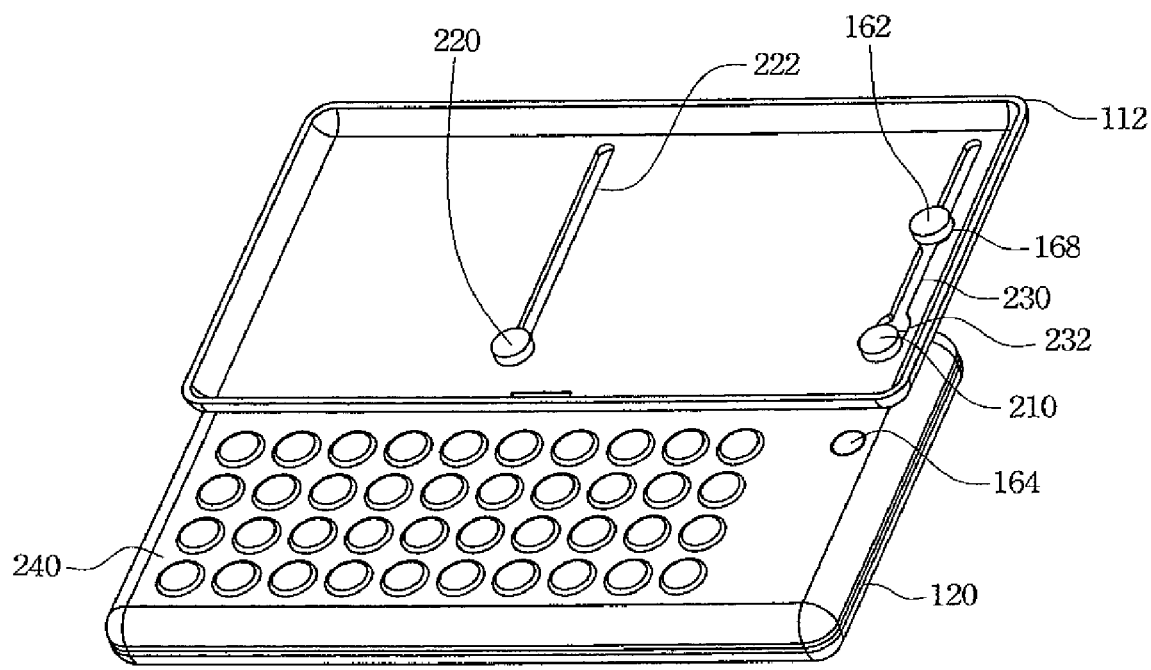

The dynamic sliding module 160 includes a guiding device, such as an attracting device 162 shown in FIG. 1, a dynamic slide 164, and sliding tracks (referring to FIGS. 2A to 2C). While the dynamic slide 164 disposed on the second electronic module 120 is aligned with the attracting device 162, the dynamic slide 164 is able to be attracted into the track through the opening 168 of the track so as to increase the sliding stability between the first electronic module 110 and the second electronic module 120. The dynamic sliding module 160 further includes an elastic device 166 to assist the dynamic slide 164 in returning to the second electronic module 120. The electronic device is preferably a slide cell phone with the first electronic module 110, such as a sliding display, and the second electronic module 120, such as a sliding keyboard. The guiding device is not limited to the attracting device 162. Any force able to guide the dynamic slide 164 into the track can be used in the dynamic sliding module according to the present invention.

FIGS. 2A to 2C illustrate the operating status of an electronic device using the dynamic sliding module according to a first preferred embodiment of the present invention. For clear illustration, a part of the first electronic module is removed to show a first shell 112, and a first slide 210, a second slide 220, a first track 230, a second track 222 and a dynamic slide 164 disposed therein.

The first slide 210 and the second slide 220 are respectively coupled to the first track 230 and the second track 222 and able to slide thereon. While the first shell 112 and the second electronic module 120 slide relative to each other, the first shell 112 can slide along the first track 230 and the second track 222 with the first slide 210 and the second slide 220 sliding in the first track 230 and the second track 222 respectively.

However, if the first slide 210 and the second slide 220 are too small, the sliding stability between the first shell 112 and the second electronic module 120 may be reduced. On the contrary, if the first slide 210 and the second slide 220 are too large, the sliding stroke of the first shell 112 and the second electronic module 120 may therefore be shortened so that the slide-out area, e.g. the area of the surface 240, on the second electronic module 120 is reduced.

The first track 230 has an opening 168 and another opening 232 such that when the dynamic slide 164 is aligned with the opening 168, the dynamic slide 164 can be attracted into the first track 230 through the opening 168 by an attractive force, e.g. a magnetic force, between the attracting device 162 and the dynamic slide 164 and thus be able to slide on the first track 230. When the first shell 112 and the second electronic module 120 are slid relative to each other, the first slide 210, the second slide 220 and the dynamic slide 164 slide coplanarly along the first track 230 and the second track 222 respectively thereby increasing the sliding stability between the first shell 112 and the second electronic module 120.

When the dynamic slide 164 moves away from the attracting device 162 and reaches the opening 232, the dynamic slide 164 can move downwards and return to the second electronic module 120. The dynamic slide 164 and the attracting device 162 are preferably attracted to each other with a magnetic force. For example, the dynamic slide 164 is made of a magnetic material while the attracting device 162 is made of a ferromagnetic material, the dynamic slide 164 is made of a ferromagnetic material while the attracting device 162 is made of a magnetic material, or both the dynamic slide 164 and the attracting device 162 are made of a magnetic material with their adjacent surfaces having different polarities.

While the dynamic slide 164 is made of a magnetic material, a magnetic device (not shown), which is made of a magnetic material and has one surface having the same polarity as the upper surface of the dynamic slide 164, can be disposed above and have the one surface facing to the opening 232, thereby replacing or assisting the elastic device 166 to push the dynamic slide 164 back to the second electronic module 120 by a repulsive force formed between the dynamic slide 164 and the magnetic device.

When the dynamic slide 164 returns back to the second electronic module 120 through the opening 232, the upper surface of the dynamic slide 164 is preferably lower or equal to the surface 240 of the second electronic module 120 to avoid interference with the sliding of the first shell 112 on the surface 240 of the second electronic module 120. After being withdrawn from the first track 230 and returning back to the second electronic module 120, the dynamic slide 164 does not occupy the first track 230 so that the first shell 112 can continuously slide along the first track 230 until the first slide 210 is moved to the end of the first track 230.

Accordingly, the dynamic sliding module according to the present invention can increase not only the sliding stability between two sliding electronic modules for an electronic device but also the slide-out area of the electronic device such that the electronic device, e.g. an slide cell phone as shown in FIGS. 2A to 2C, can provide not only a smooth sliding process but also a larger slide-out area of the surface 240 for installing additional operation devices, such as a handwriting board, thereby effectively controlling the electronic device.

Figure 3:
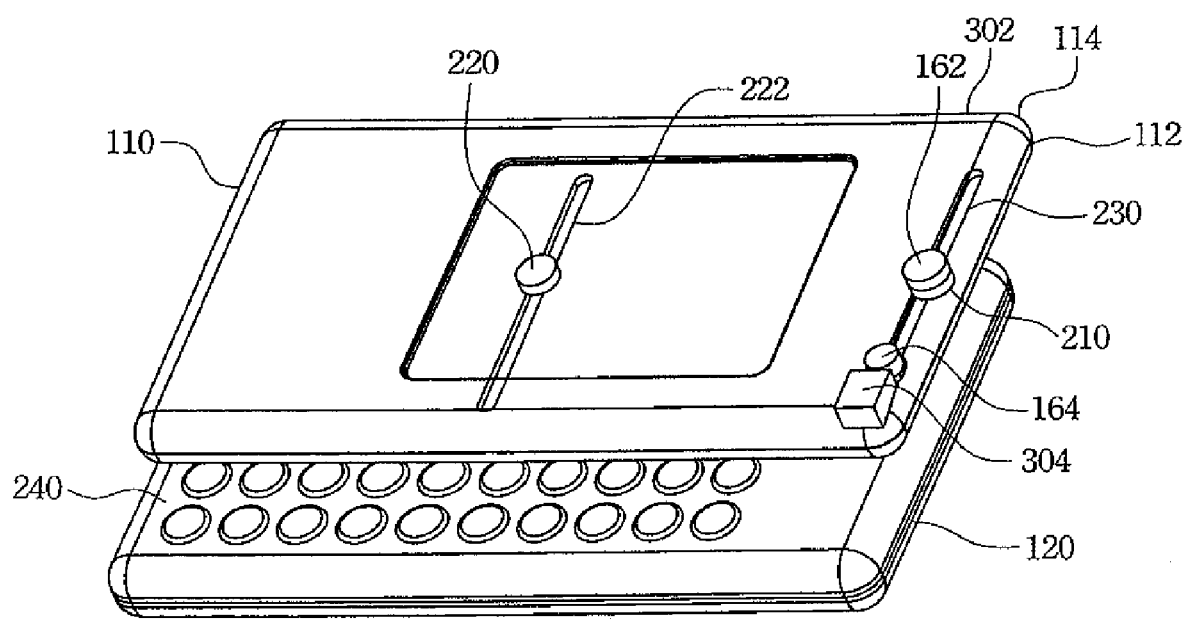
FIG. 3 illustrates a second preferred embodiment of an electronic device with the dynamic sliding module according to the present invention.

FIG. 3 illustrates an electronic device with the dynamic sliding module according to a second preferred embodiment of the present invention. Referring to the drawing, a wedge-shaped block 304 adjacent to the opening 232 of the first track 230 is disposed under a second shell 114 of the first electronic module 110. While the dynamic slide 164 is moved to the opening 232, the dynamic slide 164 can be pushed downwards and out of the opening 232 by the incline of the wedge-shaped block 304 so as to retract back to the surface 240 of the second electronic module 120.

The height of the dynamic slide 164 above the track 230 can be lower than the first slide 210 such that the dynamic slide 164 is easily pushed out of the opening 232 by the wedge-shaped block 304. Alternatively, the height of the first slide 210 above the track 230 can be designed to be as low as possible to prevent the first slide 210 from touching the wedge-shaped block 304 after the dynamic slide 164 is pushed out of the opening 232 of the track 230, thereby increasing the sliding stroke of the two electronic modules and the slide-out area. Otherwise, the wedge-shaped block 304 can be designed as a stopping block for stopping the first slide 210 from moving further.

The diameter of the dynamic slide 164 is preferably smaller than the diameter of the first slide 210 so as to prevent the first slide 210 from being disengaged from the opening 168 or the opening 232. More preferably, the diameter of the first slide 210 is larger than the diameters of the first opening 168 and the second opening 232 such that the first slide 210 can be prevented from being disengaged from the opening 168 or the opening 232 while moving along the track 230.

Accordingly, the dynamic sliding module according to the present invention can effectively increase the sliding stability between two electronic modules of an electronic device such as a slide cell phone, effectively increase the usable area (i.e. the slide-out area) on the electronic device, and further increase the operating functions thereof.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A dynamic sliding module, comprising:
   a track with a first opening and a second opening;
   a dynamic slide; and
   a guiding device for guiding the dynamic slide vertically into the track through the first opening while the dynamic slide is moved to be aligned with the first opening and apart from the second opening, wherein the dynamic slide is able to horizontally move in the track when the dynamic slide is guided vertically into the track, and the dynamic slide is withdrawn from the track through the second opening when the dynamic slide is horizontally moved to be aligned with the second opening and away from the first opening in the track.

2. The dynamic sliding module of claim 1, further comprising an elastic device coupled to the dynamic slide to withdraw the dynamic slide from the track through the second opening.

3. The dynamic sliding module of claim 1, further comprising a wedge-shaped block being disposed adjacent to the second opening and having an incline to push the dynamic slide out of the track from the second opening.

4. The dynamic sliding module of claim 1, wherein the guiding device is an attracting device.

5. The dynamic sliding module of claim 4, wherein the dynamic slide is made of a magnetic material and the attracting device is made of a ferromagnetic material.

6. The dynamic sliding module of claim 4, wherein the dynamic slide is made of a ferromagnetic material and the attracting device is made of a magnetic material.

7. The dynamic sliding module of claim 4, wherein the dynamic slide and the attracting device are made of a magnetic material and adjacent surfaces thereof have different polarities.

8. An electronic device comprising:
   a first electronic module;
   a second electronic module slidable relative to the first electronic module, wherein the first electronic module is slidably stacked on the second electronic module; and
   a dynamic sliding module coupling the first electronic module to the second electronic module, wherein the dynamic sliding module comprises:
   a track carried by the first electronic module and having a first opening;
   a dynamic slide carried by the second electronic module; and
   a guiding device carried by the first electronic module for guiding the dynamic slide vertically into the track through the first opening while the dynamic slide is moved to be aligned with the first opening, wherein the dynamic slide is able to horizontally move in the track when the dynamic slide is guided vertically into the track.

9. The electronic device of claim 8, wherein the track further comprises a second opening for withdrawing the dynamic slide from the track when the dynamic slide is horizontally moved to be aligned with the second opening and away from the first opening in the track.

10. The electronic device of claim 9, wherein the dynamic sliding module further comprises an elastic device coupled to the dynamic slide to withdraw the dynamic slide from the track through the second opening.

11. The electronic device of claim 9, further comprising a wedge-shaped block being disposed adjacent to the second opening and having an incline to push the dynamic slide out of the track from the second opening.

12. The electronic device of claim 9, wherein the dynamic sliding module further comprises a magnetic device disposed above the second opening wherein the dynamic slide and the magnetic device are made of a magnetic material and adjacent surfaces thereof have a same polarity.

13. The electronic device of claim 8, wherein the guiding device is an attracting device.

14. The electronic device of claim 13, wherein the dynamic slide is made of a magnetic material and the attracting device is made of a ferromagnetic material.

15. The electronic device of claim 13, wherein the dynamic slide is made of a ferromagnetic material and the attracting device is made of a magnetic material.

16. The electronic device of claim 13, wherein the dynamic slide and the attracting device are made of a magnetic material and adjacent surfaces thereof have different polarities.

17. The electronic device of claim 8, further comprising a first slide sliding on the track and coupling the first electronic module to the second electronic module.

18. The electronic device of claim 17, wherein the first slide has a diameter larger than a diameter of the first opening to prevent the first slide from being disengaged from the track.

19. The electronic device of claim 8, wherein the electronic device is a mobile phone, the first electronic module is a sliding display and the second electronic module is a sliding keyboard.

20. The electronic device of claim 18, further comprising a second slide coupling the first electronic module to the second electronic module and a second track carried by the first electronic module, wherein the second slide is movable in the second track, and the first slide, the second slide and the dynamic slide slide coplanarly.

21. An electronic device comprising:

a first electronic module;

a second electronic module slidable relative to the first electronic module; and a dynamic sliding module coupling the first electronic module to the second electronic module, wherein the dynamic sliding module comprises:

a track carried by the first electronic module and having a first opening;

a dynamic slide carried by the second electronic module and movable relative to both the first electronic module and the second electronic module; and a guiding device carried by the first electronic module for guiding the dynamic slide vertically into the track through the first opening while the dynamic slide is moved to be aligned with the first opening, wherein the dynamic slide is able to horizontally move in the track when the dynamic slide is guided vertically into the track.

* * * * *